United States Patent
Yen et al.

(10) Patent No.: US 8,931,547 B2
(45) Date of Patent: Jan. 13, 2015

(54) VEHICLE AIR CONDITIONING SYSTEM

(75) Inventors: Tzu-Hsiang Yen, Sagamihara (JP);
Takayoshi Matsuoka, Yokohama (JP);
Takafumi Uehara, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 305 days.

(21) Appl. No.: 13/701,200

(22) PCT Filed: Jun. 8, 2011

(86) PCT No.: PCT/IB2011/001272
§ 371 (c)(1),
(2), (4) Date: Nov. 30, 2012

(87) PCT Pub. No.: WO2011/154812
PCT Pub. Date: Dec. 15, 2011

(65) Prior Publication Data
US 2013/0068443 A1 Mar. 21, 2013

(30) Foreign Application Priority Data

Jun. 9, 2010 (JP) ................. 2010-131561

(51) Int. Cl.
*B60H 1/00* (2006.01)
*B60H 1/22* (2006.01)
(Continued)

(52) U.S. Cl.
CPC ............ *F25B 49/00* (2013.01); *B60H 1/00392* (2013.01); *B60H 1/00428* (2013.01); *B60H 1/00735* (2013.01); *F25B 29/003* (2013.01)
USPC ............... 165/202; 165/42; 165/43; 165/240; 62/228.1; 62/228.4; 62/228.5; 62/229; 62/230; 62/180; 307/32; 307/34; 307/35; 307/38; 307/39; 318/434; 392/318; 219/202; 219/208

(58) Field of Classification Search
USPC ............. 165/42, 43, 202, 240; 62/180, 228.1, 62/228.4, 228.5, 229, 230; 307/32, 34, 35, 307/38, 39; 318/434; 392/318; 219/202, 219/208
See application file for complete search history.

(56) References Cited

U.S. PATENT DOCUMENTS 4,810,943 A * 3/1989 Kawaguchi et al. .......... 318/434
5,036,676 A * 8/1991 Dudley ........................ 62/228.4
(Continued)

FOREIGN PATENT DOCUMENTS

CN 101439654 A 5/2009
JP 5-85142 4/1993
(Continued)

OTHER PUBLICATIONS

An English translation of the Russian Notice of Allowance for the corresponding Russian patent application No. 2012155597/11(088035) issued on Feb. 26, 2014.
(Continued)

*Primary Examiner* — John Ford
(74) *Attorney, Agent, or Firm* — Global IP Counselors, LLP (57) ABSTRACT

A vehicle air conditioning system includes an electric powered refrigerant compressing device, an evaporator, an electric heater, an air temperature determining component, a cabin interior temperature controlling component, an upper limit electric power setting component, and an electric power distribution controller. The evaporator receives refrigerant from the compressing device. The heater is downstream of the evaporator in an air passageway. The determining component determines a first air temperature upstream of the evaporator and a second air temperature between the evaporator and the heater. The controlling component sets a vehicle interior discharge air temperature at a position downstream of the heater to a target temperature. The power setting component sets an upper limit for power supplied to the compressing device and the heater. The power distribution controller distributes the upper limit electric power to the compressing device and the heater based on a ratio of upstream and downstream temperature differences.

4 Claims, 5 Drawing Sheets

(51) Int. Cl.
*B60H 1/32* (2006.01)
*F25B 49/00* (2006.01)
*F25B 29/00* (2006.01)

(56) References Cited

U.S. PATENT DOCUMENTS

| | | | |
|---|---|---|---|
| 5,709,098 A * | 1/1998 | Itoh et al. | 62/230 |
| 7,055,340 B2 | 6/2006 | Umebayashi et al. | |
| 7,562,698 B2 * | 7/2009 | Fujiki et al. | 62/230 |
| 7,617,692 B2 * | 11/2009 | Dage et al. | 62/230 |
| 7,739,882 B2 * | 6/2010 | Evans et al. | 62/229 |
| 2004/0168455 A1 * | 9/2004 | Nakamura | 62/244 |
| 2004/0194479 A1 | 10/2004 | Umebayashi et al. | |
| 2004/0206102 A1 | 10/2004 | Homan et al. | |
| 2005/0109499 A1 * | 5/2005 | Iwanami et al. | 165/202 |

FOREIGN PATENT DOCUMENTS

| | | |
|---|---|---|
| JP | 7-186684 A | 7/1995 |
| JP | 8-67134 A | 3/1996 |
| JP | 8-72532 A | 3/1996 |
| JP | 2000-262701 A | 9/2000 |
| JP | 2003-2039 A | 1/2003 |
| JP | 2004-203085 A | 7/2004 |
| JP | 2009-286226 A | 12/2009 |
| JP | 2010-83456 A | 4/2010 |
| KR | 100803510 B1 | 2/2008 |

OTHER PUBLICATIONS

An English translation of the Chinese Office Action for the corresponding Chinese patent application No. 201180028659.2 issued on Jul. 25, 2014.
International Search Report of PCT/IB2011/001272 dated Sep. 27, 2011, mailed Oct. 6, 2011.
An English translation of the Chinese Office Action for the corresponding Chinese patent application No. 201180028659.2 issued on Jul. 24, 2014.

* cited by examiner

VEHICLE AIR CONDITIONING SYSTEM

CROSS-REFERENCE TO RELATED APPLICATIONS

This application is a U.S. National stage of International Application No. PCT/IB2011/001272, filed Jun. 8, 2011. This application claims priority to Japanese Patent Application No. 2010-131561, filed on Jun. 9, 2010. The entire disclosure of Japanese Patent Application No. 2010-131561 is hereby incorporated herein by reference.

BACKGROUND

1. Field of the Invention

The present invention generally relates to a vehicle air conditioning system. More particularly, the present invention relates to a vehicle air conditioning system that can efficiently distribute electric power to a refrigerant compressing device and an electric heater.

2. Background Information

Vehicle air conditioning systems are known in the art. For example, Japanese Laid-Open Patent Publication No. H05-85142 describes a vehicle air conditioning system that has a variable capacity refrigerant compressor and an evaporator through which compressed refrigerant circulates. The system is configured to warm air that has been cooled by the evaporator and propel air having a prescribed temperature into a vehicle cabin. An air mix door controls a mixture ratio of an amount of air cooled by the evaporator and an amount of air heated by the heater to achieve a desired temperature of the air that is blown into the vehicle cabin.

SUMMARY

However, in the system described in Japanese Laid-Open Patent Publication No. H05-85142, the energy required for cooling and heating are not managed. Therefore, wasteful energy consumption occurs and a distance that the vehicle can travel can decline. Accordingly, an object of the present invention is to provide a vehicle air conditioning system that can reduce energy consumption.

In view of the state of the known technology, a vehicle air conditioning system basically comprises an electric powered refrigerant compressing device, an evaporator, an electric heater, an air temperature determining component, a cabin interior temperature controlling component, an upper limit electric power setting component, and an electric power distribution controller. The evaporator is configured to receive refrigerant discharged from the electric powered refrigerant compressing device. The electric heater is arranged downstream of the evaporator in an air passageway. The air temperature determining component is configured to determine a first air temperature at a position upstream of the evaporator in the air passageway and a second air temperature at a position between the evaporator and the electric heater. The cabin interior temperature controlling component is configured to set a vehicle interior discharge air temperature at a position downstream of the electric heater in an air passageway to a target discharge air temperature. The upper limit electric power setting component is configured to set an upper limit for electric power that can be supplied to the electric powered refrigerant compressing device and the electric heater. The electric power distribution controller is configured to distribute the upper limit electric power to the electric powered refrigerant compressing device and the electric heater based on a ratio of an upstream temperature difference and a downstream temperature difference, where the upstream temperature difference is based on a difference between the first air temperature and the second air temperature and the downstream temperature difference is based on a difference between the target discharge air temperature and the second air temperature.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
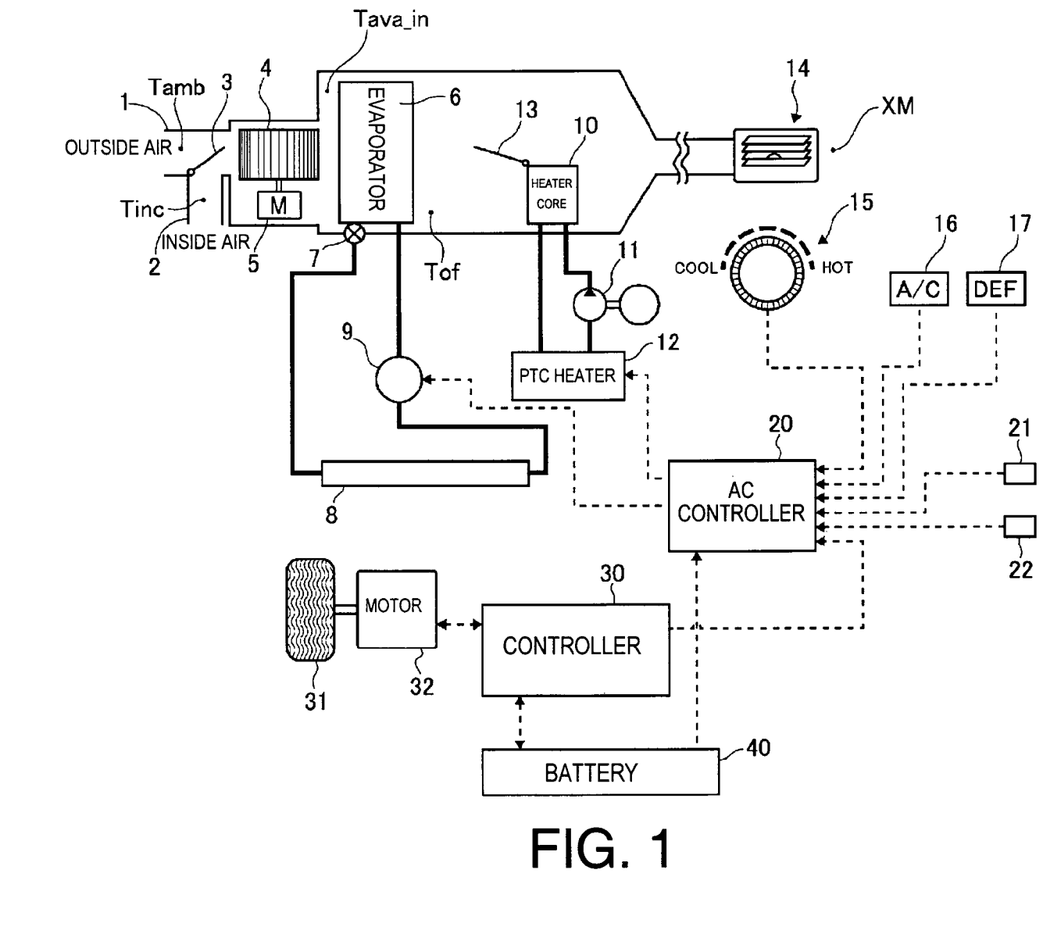
FIG. 1 is a schematic system diagram showing an example of a vehicle air conditioning system according to a disclosed embodiment.

FIG. 1 is a system diagram illustrating an example of a vehicle air conditioning system in accordance with a disclosed embodiment. In this example, the vehicle that includes the vehicle air conditioning system is an electric vehicle. The electric vehicle includes a battery 40 that supplies electric power to operate a drive motor 32. The drive motor 32 thus drives a drive wheel 31 to propel the vehicle. Also, instead of being an electric vehicle, the vehicle can include an internal combustion engine, or can be a hybrid vehicle that uses both a combustion engine and an electric motor. Furthermore, the vehicle can be a car, truck, van, SUV or any other suitable type of vehicle.

Typically, a controller in the vehicle detects a drive force that is requested by a driver by, for example, depressing an accelerator pedal. The controller thus controls the supplying of electric power from the battery 40 to the drive motor 32 in accordance with the requested drive force. During braking, regenerative braking can be performed, and electric power generated by the drive motor 32 can be supplied to the battery 40. Typically, the drive control and regenerative braking control are executed by a general controller 30. The general controller 30 can perform the controlling operations based on a state of charge (SOC) of the battery 40 and various driving conditions to achieve a traveling state in accordance with the driver's request while increasing the electric power consumption efficiency of the vehicle.

The vehicle air conditioning system has an outside air intake port 1 configured to take in air from outside the vehicle cabin and an inside air intake port 2 configured to take in air from inside the vehicle cabin. The vehicle air condition system further has an intake door 3 configured to control an inside air mixture ratio Xrec. The air mixture ratio Xrec represents a ratio of an amount of air taken in through the outside air intake port 1 and an amount of air taken in through the inside air intake port 2. The intake door 3 is controlled, for example, opened and closed as appropriate based on the internal air mixture ratio Xrec which is set by a driver or requested by automatic air conditioning control. The air taken in through the air inlet ports is supplied to an evaporator 6 by, for example, a blower fan 4 driven by a motor 5. The motor 5 drives the blower fan 4 as appropriate based on an airflow quantity set by a driver or requested by automatic air conditioning control.

The evaporator 6 operates to cool air introduced to the evaporator 6 by exchanging heat between the air and a compressed refrigerant that passes through the evaporator 6. The cooling system includes the evaporator 6 for exchanging heat, a variable capacity refrigerant compressor 9, a condenser 8, and an expansion valve 7. After completing an exchange of heat in the evaporator 6, the refrigerant is compressed by the variable capacity refrigerant compressor 9, which can also be referred to as an electric powered refrigerant compressing device. The variable capacity compressor 9 can be driven by an electric motor and configured to produce a compression performance in accordance with a supplied electric power. The cooling performance is higher when the variable capacity compressor 9 is driven at a larger capacity because the compression performance is higher. The cooling performance is smaller when the variable capacity compressor 9 is driven at a smaller capacity because the compression performance is lower. In other words, the cooling performance is greater when the electric power supplied is larger, and the cooling performance is lower when the electric power supplied is smaller.

As understood in the art, refrigerant compressed by the variable capacity compressor 9 is changed to a liquid in the condenser 8. The liquid refrigerant is diffused into a mist by the expansion value 7 and supplied to the inside of the evaporator 6. The cooling system itself can be a conventional type of cooling system and therefore will not be described in further detail. In this embodiment, the component of the cooling system that consumes the most electric power is the variable capacity compressor 9. Thus, the amount of electric power distributed to the cooling system is basically the same as the amount of electric power distributed to the variable capacity compressor 9.

After passing through the evaporator 6, the cooled air is supplied to and heated by a heater core 10 that is arranged downstream along an air passageway. The heater system, which can be referred to as an electric heater, includes the heater core 10, a PTC heater 12 and a pump 11 that is configured to supply heated water from inside the PTC heater 12 to the heater core 10. The heater core 10 operates to heat air introduced to the heater core 10 by exchanging heat between the air and the heated water passing through the heater core 10. The pump 11 is driven by an electric motor and circulates the heated water. The pump 11 generally has low electric power consumption because the pump 11 generally serves simply to circulate the heated water. The pump 11 is configured to execute a prescribed operation automatically when there is a request for air to be heated by the heater core 10.

The PTC heater 12 is a heating element having a self temperature controlling characteristic in this example. The PCT heater 12 heats up in accordance with a supplied electric power until reaching a prescribed temperature. When the PTC heater 12 reaches the prescribed temperature, a resistance value increases sharply and the element maintains a constant temperature. The water that passes through the PTC heater 12 is heated to a prescribed temperature and supplied as heated water. In other words, the heating performance is greater when the electric power supplied is larger, and the heating performance is lower when the electric power supplied smaller. In this embodiment, the component of the heating system that generally consumes the most electric power is the PTC heater 12. Thus, the amount of electric power distributed to the heating system is basically the same as the amount of electric power distributed to the PTC heater 12.

The system further includes an air discharge port 14 that functions to blow out air that has been conditioned by the cooling system and the heater system. The system also includes a cabin interior temperature setting device 15, such as a thermostat, that is configured to enable a driver to set a cabin interior temperature. An air conditioner switch 16 is configured to permit or prohibit operation of the variable capacity compressor 9 in the cooling system. The system further includes a defroster switch 17 that is configured to issue a request for defrosting and/or defogging of a windshield. The air discharge port 14 can be referred to as a single entity for purposes of this example. However, the air discharge port 14 actually includes a plurality of air conditioning vents and defrosting vents. The positions where air is discharged are configured as appropriate in accordance with a discharge mode selected by a driver or requested by automatic air conditioning control. For example, in a first discharge mode, the conditioned air is discharged from the air conditioning vents. In a second discharge mode, the conditioned air is discharged from the air conditioning ducts and foot ducts. In a third discharge mode, the conditioned air is discharged from the air conditioning vents, the foot ducts, and the defrosting vents.

When a mode using a large number of discharge ports is selected, the amount of air discharged is larger and, thus, the airflow quantity is larger. Conversely, when a mode using a small number of air discharge ports is selected, the amount of air discharged is smaller and the airflow quantity is smaller. Consequently, as explained in more detail below, a second air temperature Tof should be lower when the number of air discharge ports is larger. That is, assuming the same or substantially the same electric power is used, the air cooling performance or air heating performance differs depending on the discharge mode.

The system further includes an air conditioner controller 20 that receives signals from the cabin interior temperature setting device 15, the air conditioner switch 16 and the defroster switch 17. The air conditioner controller 20 further receives a sensor signal from an ambient air temperature sensor 21 that is arranged near the outside air intake port 1 and configured to detect an ambient air temperature outside of the vehicle. In addition, the air conditioner controller 20 receives an inside air temperature sensor 22 that is arranged near the inside air intake port 2 and configured to detect an inside air temperature inside the vehicle cabin. The air conditioner controller 20 is also connected to the general controller 30 via, for example, a controller area network (CAN) communication line such that the air conditioner controller 20 receives a maximum deliverable electric power INLmax that is set based on such factors as a battery SOC from the general controller 30.

It should be noted that the air conditioner controller 20, the controller 30 and any other controller discussed herein, can each include or share, for example, a microcomputer with a control program that controls and interacts with the components of the vehicle as discussed herein. The air conditioner controller 20, the controller 30 and any other controller discussed herein can also each include or share other conventional components such as an input interface circuit, an output interface circuit, and storage devices such as a ROM (Read Only Memory) device and a RAM (Random Access Memory) device. The RAM and ROM store processing results and control programs that are run by the air conditioner controller 20 and the controller 30. Furthermore, the air conditioner controller 20, the controller 30 and any other controller discussed herein are operatively coupled to the components of the vehicle in a conventional manner. It will be apparent to those skilled in the art from this disclosure that the precise structure and algorithms for the air conditioner controller 20, the controller 30 and any other controller discussed herein can be any combination of hardware and software that will carry out the functions of the embodiments discussed herein.

When the vehicle is an electric vehicle, the vehicle is propelled by the battery 40, and the battery 40 is essentially the only energy source. Thus, when the state of charge of the battery 40 is low, the amount of electric power that can be supplied to the air conditioner is limited to a lower value to give priority to propelling the vehicle. Conversely, when the state of charge is equal to or above a prescribed value, an ample amount of electric power is available to supply to the air conditioner.

The air conditioner controller 20 executes a cabin interior temperature control based on the aforementioned sensor signals and switch signals to achieve a comfortable environment inside the vehicle cabin while reducing the consumption of electric power. More specifically, when a target cabin interior temperature is set by the cabin interior temperature setting device 15, a target discharge air temperature XM is set based on, for example, a difference between the target cabin interior temperature and an actual interior air temperature. For example, if the interior air temperature is lower than the target cabin interior temperature, then a higher temperature value is set for the target discharge air temperature XM. Conversely, if the interior air temperature is higher than the target cabin interior temperature, then a lower temperature value is set for the target discharge air temperature XM. The cooling system and the heater system are operated to achieve the target discharge air temperature XM and deliver comfortable, appropriately dehumidified air to the cabin.

As understood in the art, a conventional air conditioning system used in a vehicle equipped with an internal combustion engine or other engine is configured to dehumidify the air supplied to the cabin interior as necessary by cooling the air to, for example, approximately 4° C. near an evaporator outlet, using a compressor driven by the engine. The cooled air is then heated by a heater core through which engine coolant flows and serves as heated water. The air is heated to a desired temperature and blown into the cabin. However, although the conventional air conditioning system may operate properly while the engine is operating normally, the operation does not occur when the engine is stopped. Furthermore, even when cooling is not necessary, the compressor imposes a load on the engine and the engine continues to generate heat. Consequently, energy efficiency is reduced.

In an electric vehicle that is not equipped with an engine, the heater system uses electric power as the heat source. In such a vehicle, if the electric power supplied to the cooling system and the heater system is not optimized, then air may be cooled and heated unnecessarily. Thus, wasteful use of battery power will increase, which can have an adverse effect on the distance that the vehicle can travel without recharging the battery. As will now be described, a vehicle air conditioning control process according to a disclosed embodiment can be performed that can distribute electric power to the cooling system and the heater system in a desired or optimal manner.

Figure 2:
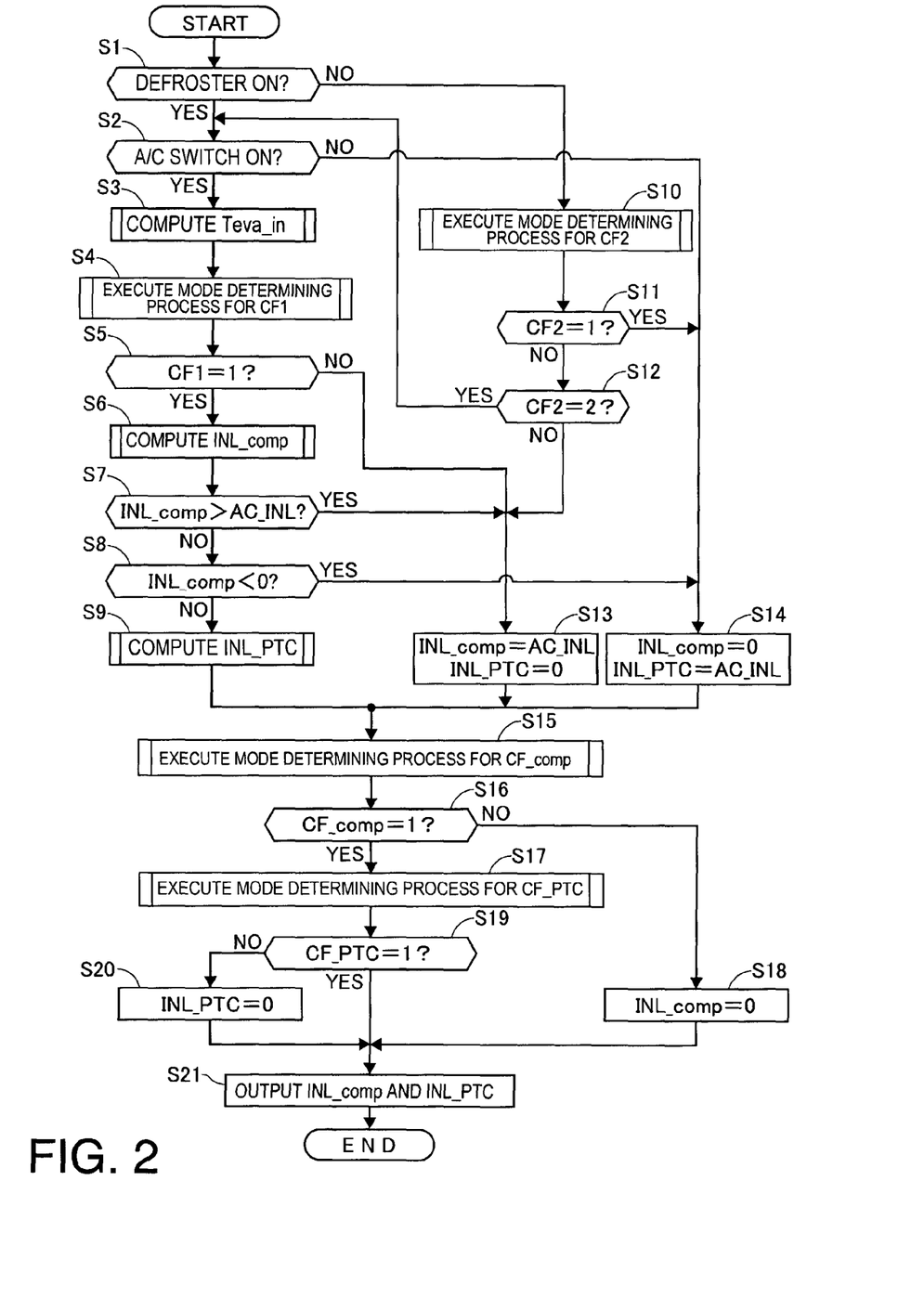
FIG. 2 is a flowchart an example of operations that can be performed by the air conditioning controller of the vehicle air conditioning system.

FIG. 2 is flowchart illustrating an example air conditioning controlling operations that can be performed by the system. This flowchart can thus be used to explain processing operations relating to electric power distribution. It is assumed that the intake door 3, the operation of the blower fan 4, an air mix door 13, and so on are controlled according to separate control sequences. Also, although the air conditioner controller 20 is described as performing these operations, any suitable controller or plurality of controllers in the system can perform the operations.

In step S1, the air conditioner controller 20 determines if the defroster switch 17 is on. If the switch 17 is on, then the air conditioner controller 20 processing continues to step S2. However, if the switch 17 is off, then the air conditioner controller 20 determines that driver is satisfied with the humidity and the processing proceeds to step S10 as described below.

In step S2, the air conditioner controller 20 determines if the air conditioner switch 16 is on. If the switch 16 is on, then the air conditioner controller 20 processing continues to step S3. However, if the switch 16 is off, then the air conditioner controller 20 determines that driver is does not desire to cool air and the processing proceeds to step S14.

In step S3, the air conditioner controller 20 computes a first air temperature Teva_in at a position upstream of the evaporator 6 in the air flow passage using the exemplary equation shown below. This operation can be referred to as an air temperature detecting operation. The air conditioner controller 20 thus functions in this regard as an air temperature determining component.

$$Teva\_in = \{(Tamb + \Delta Teva\_in) \times (1 - Xrec) + Tinc \times Xrec\}$$

In this equation, Tamb represents an ambient temperature detected by the ambient temperature sensor 21, Tinc represents an inside air temperature detected by the inside air temperature sensor 22, and Xrec represents an inside air mix ratio. Although the first air temperature Teva_in is estimated with a computation in this example, a sensor can be provide to detect the first air temperature Teva_in.

Figure 3:
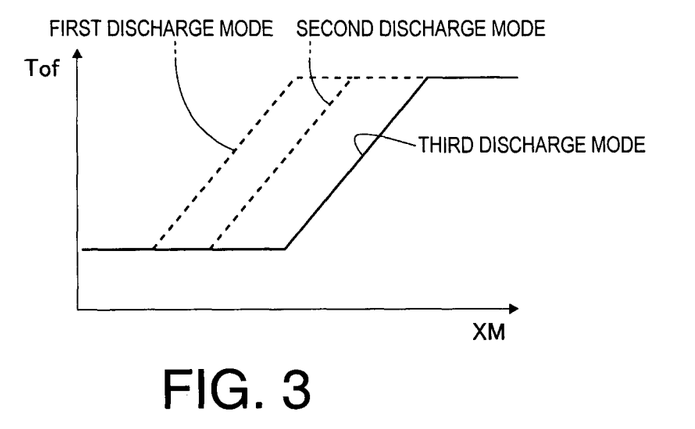
FIG. 3 is a graph illustrating an example of an evaporator downstream-side temperature characteristic of the vehicle air conditioning system.

In step S4, the air conditioner controller 20 executes a mode determining process for a mode flag CF1 that expresses whether or not the heater system should be used. First, the air conditioner controller 20 estimates the second air temperature Tof between the evaporator 6 and the heater core 10. FIG. 3 is a graph illustrating an example of estimated values of the second air temperature Tof. The air conditioner controller 20 selects a characteristic curve based on the discharge mode, and estimates the second air temperature Tof based on the target discharge air temperature XM. This operation can also be referred to as an air temperature detecting operation. Also, a sensor can be provided to detect the second air temperature Tof.

Figure 5:
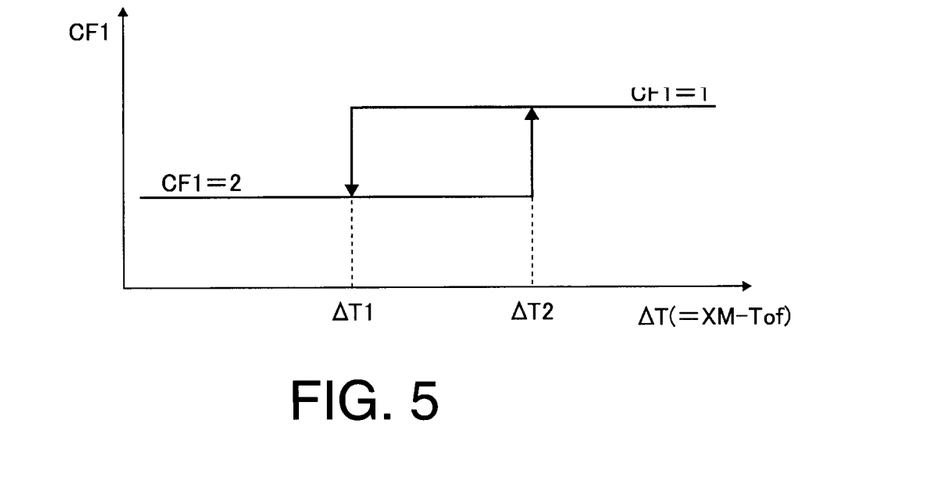
FIG. 5 is a timing diagram illustrating an example of a state of a flag CF1 used by the vehicle air conditioning system.

The air conditioner controller 20 then calculates a difference ΔT between the target discharge air temperature XM and the second air temperature Tof, and sets the flag CF1 based on the difference ΔT. FIG. 5 is an exemplary mode determining timing chart for the flag CF1. If the difference ΔT is larger than a prescribed value ΔT2 (or ΔT1), then the flag CF1 is set to 1 because there is a strong need for the air to be warmed by the heater core 10. Conversely, if the difference ΔT is smaller than a prescribed value ΔT1 (or ΔT2), then the flag CF1 is set to 2 because there is there is little need for the air to be warmed by the heater core 10. The flag CF1 can be set, for example, in accordance with a hysteresis characteristic to avoid control hunting as understood in the art.

In step S5, the air conditioner controller 20 determines if the flag CF1 is set to 1. The air conditioner controller 20 processing continues to step S6 if the flag CF1 is set to 1, and continues to step S13 if the flag CF1 is set to 2. If the flag CF1 equals 2, then it is not necessary to heat air with the heater core 10. Therefore, the air conditioner controller sets an electric power INL_PTC to be distributed to the heater system to zero (0), and sets an electric power INL_comp to be distributed to the cooling system to an electric power upper limit AC_INL. The electric power upper limit AC_INL is explained in more detail below.

In step S6, the air conditioner controller 20 reads in the electric power upper limit AC_INL and computes the electric power INL_comp to be distributed to the cooling system. The electric power upper limit AC_INL and the processing executed to compute the electric power INL_comp will now be explained.

Figure 4:
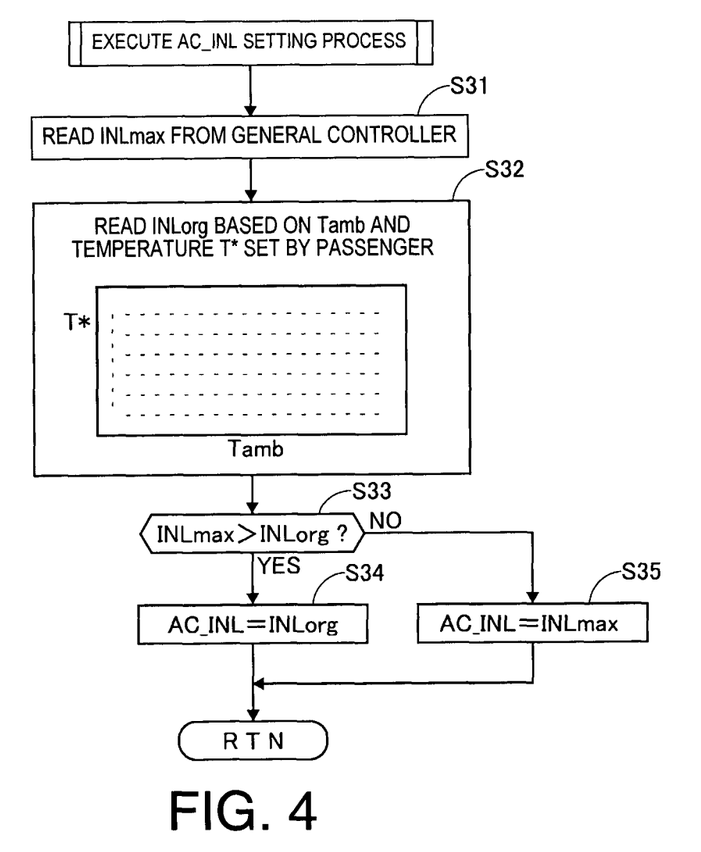
FIG. 4 is a flowchart illustrating an example of operations that can be performed by the vehicle air conditioning system to set an electric power upper limit.

FIG. 4 is flowchart illustrating an example of operations that can be performed for setting an electric power upper limit AC_INL. In step S31, the air conditioner controller 20 reads in a maximum deliverable electric power INLmax received from the general controller 30. In step S32, the air conditioner controller 20 reads in an ambient temperature Tamb and a passenger set temperature T* that was set, for example, via the vehicle interior temperature setting device 15. The air conditioner controller 20 uses the values of the ambient temperature Tamb and the passenger set temperature T* to read an air conditioner self-limiting electric power INLorg from a map that has been stored in advance. In step S33, the air conditioner controller 20 determines if INLmax>INLorg. If INLmax>INLorg, then the air conditioner controller 20 sets the value INLorg as an electric power upper limit in step S34. In this event, the air conditioner controller 20 functions as an upper limit electric power setting component. If INLmax is not greater than INLorg, then the air conditioner controller 20 sets the value INLmax as the electric power upper limit in step S35. This operation can be referred to as an electric power upper limit setting operation. Thus, electric power is conserved by selecting the lower value between a value limited by the general controller 30 and a value limited based on a self-imposed limitation executed by the air conditioning system.

An amount of electric power INL_comp that is distributed to the cooling system, that is, to the variable capacity compressor 9, is calculated according to the following equation:

$$INL\_comp = AC\_INL \times \{(Teva\_in - Tof) \times \eta 1\} / \{(XM - Tof) \times \eta 2 + (Teva\_in - Tof) \times \eta 1\}$$

In the equation, $\eta 1$ represents a temperature conversion efficiency of the evaporator 6, and $\eta 2$ represents a temperature conversion efficiency of the heater core 10. Therefore, electric power to be distributed to the cooling system and an electric power to be distributed to the heater system are calculated based on the electric power upper limit AC_INL and a ratio of an upstream temperature difference (Teva_in−Tof) between the second air temperature Tof and the first air temperature Teva_in at a position in the air passageway that is located upstream of the evaporator 6 and a downstream temperature difference (XM−Tof) between the target discharge air temperature XM and the second air temperature Tof. In other words, the electric power upper limit AC_INL is distributed based on a ratio of a temperature decrease (upstream temperature difference) that is to be accomplished by the cooling action of the cooling system and a temperature increase (downstream temperature difference) that is to be accomplished by the heating action of the heater system. As a result, unnecessary cooling and heating by the respective systems can be prevented, and the air conditioning system can be operated more efficiently. Also, dehumidification can be accomplished without exceeding the electric power upper limit AC_INL, and an anti-fogging effect can be accomplished with respect to the windshield.

Turning back to FIG. 7, the air conditioner controller 20 determines in step S7 if the electric power INL_comp is larger than the upper limit electric power AC_INL. If so, then the air conditioner controller 20 determines that cooling is a priority and the processing proceeds to step S13. In step S13, the air conditioner controller 20 sets the electric power INL_PTC to be distributed to the heater system to zero (0), and sets the electric power INL_comp to be distributed to the cooling system to the electric power upper limit AC_INL. Conversely, if INL_comp is equal to or smaller than the electric power upper limit AC_INL, then the air conditioner controller 20 processing proceeds to step S8.

In step S8, the air conditioner controller 20 determines if the electric power INL_comp is negative. If INL_comp is negative, then it is not necessary to supply electric power to the cooling system and the air conditioner controller 20 proceeds to step S14. In step S14, the air conditioner controller 20 sets the electric power INL_comp to be distributed to the cooling system to zero (0) and sets the electric power INL_PTC to be distributed to the heater system to the electric power upper limit AC_INL. Conversely, if INL_comp is equal to or larger than zero (0), then the air conditioner controller 20 processing proceeds to step S9.

In step S9, the air conditioner controller 20 computes the electric power INL_PTC to be distributed to the heater system as indicated in the following equation:

$$INL\_PTC = AC\_INL - INL\_comp$$

This operation can be referred to as an electric power distribution control operation, with the air conditioner controller 20 functioning as an electric power distribution controller. In other words, the electric power to be supplied to the cooling system and the electric power to be supplied to the heater system are set in accordance with the upstream temperature difference and the downstream temperature difference.

Figure 6:
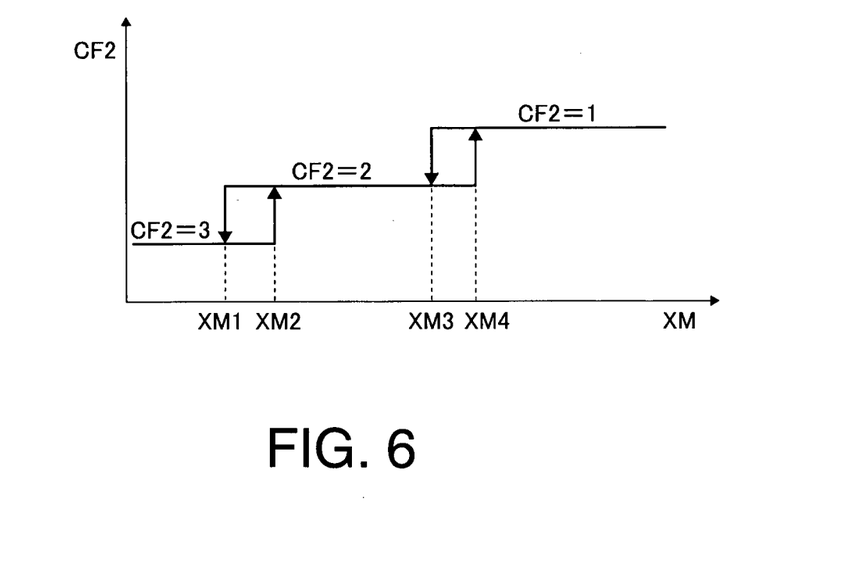
FIG. 6 is a timing diagram illustrating an example of a state of a flag CF2 used by the vehicle air conditioning system.

In step S10, the air conditioner controller 20 executes a mode determining process for a mode flag CF2 that expresses whether it is necessary to operate both the cooling system and the heater system or to operate only one or the other. This operation can be referred to as an electric power distribution control operation. FIG. 6 is a timing diagram for the flag CF2. If the target discharge air temperature XM is lower than a value XM1 (or XM2) thus indicating a low temperature, then there is little need to warm the air with the heater core 10 and the flag CF2 is set to 3. Also, the values XM1 and XM2 are configured to have a hysteresis characteristic. If the target discharge air temperature XM is higher than a value XM4 (or XM3) thus indicating a high temperature, then there is little need to cool the air with the cooling system and the flag CF2 is set to 1. The values XM3 and XM4 also are configured to have a hysteresis characteristic.

If neither of the conditions mentioned above exists, then both the cooling system and the heater system are to be used, and the flag CF2 is set to 2. Thus, depending on the target discharge air temperature XM, electric power can be concentrated at one system by delivering electric power to that one of the systems. As a result, the electric power consumption can be reduced and the cruising distance can be improved. Also, the processing explained above is executed when the defrost switch 17 is off. In other words, when the need for humidity management is small, electric power consumption is suppressed by operating the air conditioning system such that simply temperature is taken into account.

Turning back to FIG. 2, the air conditioner controller 20 determines in step S11 if the value of the flag CF2 is 1. If the value is 1, then the air conditioner controller 20 determines that it is not necessary to operate the cooling system and proceeds to step S14, where INL_comp is set to zero (0) and INL_PTC is set to AC_INL. In step S12, the air conditioner controller 20 determines if the value of the flag CF2 is 2. If the value is 2, then the air conditioner controller 20 determines that both the heating and cooling systems are to be operated, and the processing proceeds to step S2. On the other hand, if the value of the flag CF2 is not 2 but 3, then it is not necessary to operate the heater system. The air conditioner controller 20 processing thus proceeds to step S13, where INL_PTC is set to AC_INL and INL_PTC is set to zero (0).

Figure 7:
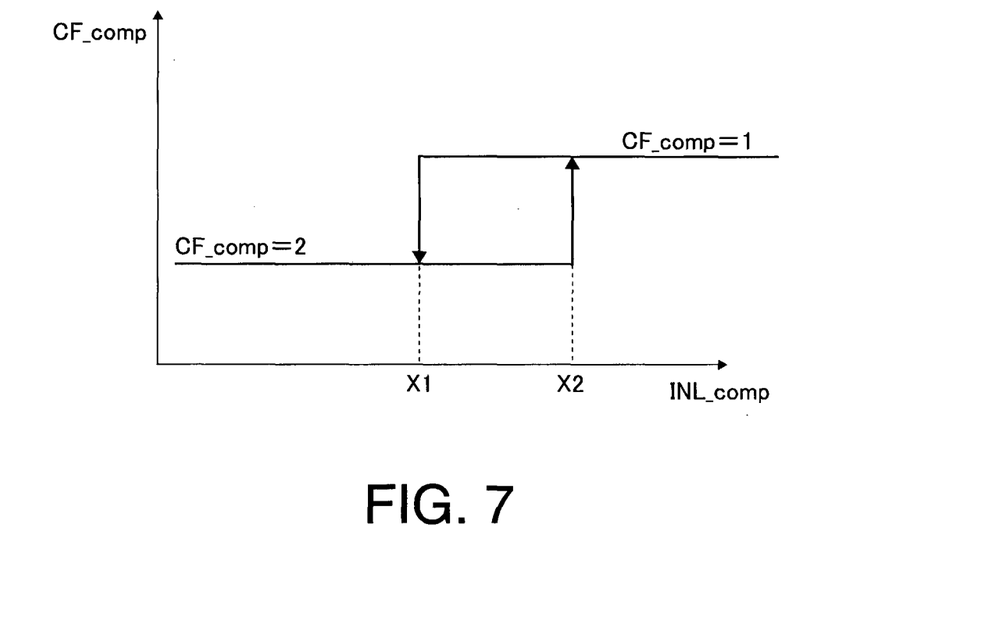
FIG. 7 is a timing diagram illustrating an example of a state of a compressor used by the vehicle air conditioning system.

In step S15, the air conditioner controller 20 executes a mode determining process for a mode flag CF_comp that expresses whether or not electric power is to be supplied to the cooling system. FIG. 7 is an exemplary timing diagram for the flag CF_comp. If the electric power INL_comp is larger than a prescribed value x2 (or x1), then the flag CF_comp is set to 1 and the currently set electric power INL_comp is supplied as is or substantially as is. If the electric power INL_comp is smaller than a prescribed value x1 (or x2), then, even if the cooling system is operated with the electric power INL_comp, a passenger will generally not feel an improvement to the atmosphere of the cabin interior due to operation of the air conditioning system and the efficiency will be poor. Therefore, in such a case, the flag CF_comp is set to 2. Also, the values x1 and x2 express hysteresis characteristics as do the other values discussed above.

In step S16, the air conditioner controller 20 determines if the value of the flag CF_comp is 1. If the value is 1, then the air conditioner controller 20 processing proceeds to step S17. If the value is 2, then the air conditioner controller 20 proceeds to step S18 and sets the electric power INL_comp to zero (0). In other words, if it is anticipated that the atmosphere inside the vehicle cabin will not be improved by operating the air conditioning system, then the electric power supplied to the air conditioning system is set to zero (0). This reduces the consumption of electric power and improves the distance that the vehicle can travel without charging the battery. This operation can also be referred to as an electric power distribution control operation.

Figure 8:
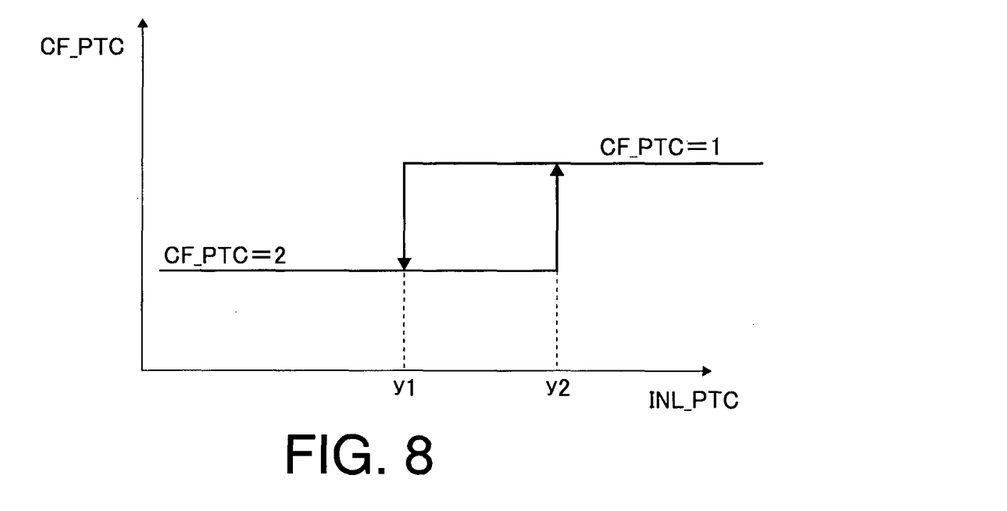
FIG. 8 is a timing diagram illustrating an example of a state of a positive temperature coefficient (PTC) heater used by the vehicle air conditioning system.

In step S17, the air conditioner controller 20 executes a mode determining process for a mode flag CF_PTC that expresses whether or not electric power is to be supplied to the heater system. FIG. 8 is an exemplary timing diagram for the flag CF_PTC. If the electric power INL PTC is larger than a prescribed value y2 (or y1), then the flag CF_PTC is set to 1 and the currently set electric power INL_PTC is supplied as is or substantially as is. If the electric power INL_PTC is smaller than a prescribed value y1 (or y2), then, even if the heater system is operated with the electric power INL_PTC, a passenger will not feel an improvement to the atmosphere of the cabin interior due to the air conditioning action and the efficiency will be poor. Therefore, in such a case, the flag CF_PTC is set to 2. The values y1 and y2 express hysteresis characteristics as do the other values discussed above.

In step S19, the air conditioner controller 20 processing determines if the value of the flag CF_PTC is 1. If the value is 1, then the air conditioner controller 20 processing proceeds to step S21. If the value is 2, then the air conditioner controller 20 processing proceeds to step S20 and sets the electric power INL_PTC to zero (0). In other words, if it is anticipated that the atmosphere inside the vehicle cabin will not be improved by operating the air conditioning system, then the electric power supplied to the air conditioning system is set to zero (0). This reduces the consumption of electric power and improves the distance that the vehicle can travel without charging the battery. This operation can be referred to as an electric power distribution operation. Then, in step S21, the electric powers INL_comp and INL_PTC ultimately set based on the operations discussed above are output to the respective systems.

As can be appreciated from the above, the system includes a variable capacity compressor 9 (e.g., an electric powered refrigerant compressing device) that is driven by an electric motor. The system further includes an evaporator 6 to which a refrigerant discharged from the variable capacity compressor 9 is supplied, and a heater core 10 (electric heater) that is heated by a PTC heater 12 arranged downstream of the evaporator 6 in an air passageway. The operations performed in steps S3 and S4 discussed above detect or estimate a first air temperature Teva_in at a position upstream of the evaporator 6 in the air passageway and a second temperature Tof at a position between the evaporator 6 and the heater core 10. The air conditioner controller 20 is thus configured to control the system such that a vehicle interior discharge air temperature at a position downstream of the heater core 10 in the air passageway matches a target discharge air temperature. In the operations performed in step S31 discussed above, an electric power upper limit AC_INL that can be supplied to a cooling system including the variable capacity compressor 9 and a heater system including the heater core 10 is set. In the operations performed in steps S6 and S9 discussed above, the upper limit electric power AC_INL is provided to the cooling system and the heater system based on a ratio of an upstream temperature difference (Teva_in–Tof) and a downstream temperature difference (XM–Tof). The upstream temperature difference is a difference between the first air temperature Teva_in and the second air temperature Tof, and the downstream temperature difference is a difference between a target discharge air temperature XM and the second air temperature Tof.

Thus, the refrigerant compressing performance for the cooling system and the cooled air heating performance for the heater system can be achieved efficiently without exceeding the set upper limit electric current AC_INL. Accordingly, the distance that the vehicle can travel without recharging the battery can be improved by reducing wasteful energy consumption.

In addition, in the processing performed in steps S15 to S20, the supply of electric power to the cooling system is stopped when the electric power to be distributed to the cooling system is equal to or below a value x1 or a value x2. Also, the supply of electric power to the heater system is stopped when the electric power to be distributed to the heater system is equal to or below a value y1 or a value y2. Thus, the consumption of electric power can be reduced and the distance that the vehicle can travel without recharging the battery can be increased by setting the electric power supplied to the air conditioning system to zero (0) when it is anticipated that the atmosphere inside the vehicle cabin will not be improved by operating the air conditioning system. Alternatively, instead of stopping the supply of electric power, the supplying of the electric power can be limited based on a prescribed ratio as discussed above.

Furthermore, in the processing performed in steps S10 to S14 as discussed above, electric power is supplied to the cooling system (and not the heating system) when the target discharge air temperature XM is lower than a temperature XM1 or a temperature XM2 (a first prescribed temperature). Also, electric power is supplied to the heater system (and not the cooling system) when the target discharge air temperature XM is equal to or higher than a temperature XM4 or XM3 (a second prescribed temperature) that is higher than the first prescribed temperature. Thus, depending on the target discharge air temperature XM, electric power can be concentrated at one system by delivering electric power to only one of the systems. As a result, the electric power consumption can be reduced and the distance that the vehicle can travel without recharging the battery can be improved.

In addition, also the above example relates to a vehicle air conditioning system that is installed in an electric car, the features and operations described above can also be applied to an air conditioning system installed in a vehicle driven by a combustion engine or in a hybrid vehicle. Also, although first air temperature Teva_in is estimated by computer calculation in the above example, a separate temperature sensor or the like can be used to detect the first air temperature Teva_in directly. Also, in the above example, the second air temperature Tof is calculated based on the target discharge air temperature XM using on a prepared map. This approach can be used in view of a convergence characteristic of the target discharge air temperature XM. However, a separate temperature sensor can be provided to detect the target discharge air temperature XM directly.

Furthermore, in the above example, the variable capacity compressor 9 is the main consumer of electric power in the cooling system. Also, the PTC heater 12 is the main consumer of electric power in the heater system. Therefore, the electric power supply is distributed accordingly based on the specific demands of these two main power consumers. However, it is also acceptable to set an electric power distribution ratio for the cooling system versus the heater system in a manner that takes into account the electric power consumption of electric powered actuators included in the respective systems.

The features and operations discussed above can also be employed in any other system that includes a cooling system and a heating system and operates using electric power. Also, although a PTC heater 12 is used in the heater system of the example described above, another type of heating element can be used. That is, the features and operations discussed above can be applied in order to distribute electric power in an optimum fashion to each of the systems while staying within a limited range of electric power consumption.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired.

Also, components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle air conditioning system comprising:
    an electric powered refrigerant compressing device;
    an evaporator configured to receive refrigerant discharged from the electric powered refrigerant compressing device;
    an electric heater arranged downstream of the evaporator in an air passageway;
    an air temperature detector configured to determine a first air temperature at a position upstream of the evaporator in the air passageway and a second air temperature at a position between the evaporator and the electric heater;
    a cabin interior temperature controlling component configured to set a vehicle interior discharge air temperature at a position downstream of the electric heater in an air passageway to a target discharge air temperature;
    an upper limit electric power setting component configured to set an upper limit for electric power that can be supplied to the electric powered refrigerant compressing device and the electric heater; and
    an electric power distribution controller configured to distribute the upper limit electric power to the electric powered refrigerant compressing device and the electric heater based on a ratio of an upstream temperature difference and a downstream temperature difference, where the upstream temperature difference is based on a difference between the first air temperature and the second air temperature and the downstream temperature difference is based on a difference between the target discharge air temperature and the second air temperature.

2. The vehicle air conditioning system according to claim 1, wherein
    the electric power distribution controller is further configured to restrict supplying electric power to the electric powered refrigerant compressing device when the electric power to be distributed to the electric powered refrigerant compressing device is equal to or below a first prescribed value, and to restrict supplying electric power to the electric heater when the electric power to be distributed to the electric heater is equal to or below a second prescribed value.

3. The vehicle air conditioning system according to claim 1, wherein
    the electric power distribution controller is configured to supply electric power to the electric powered refrigerant compressing device without supplying electric power to the electric heater when the target discharge air temperature is lower than a first prescribed temperature, and to supply electric power to the electric heater without supplying electric power to the electric powered refrigerant compressing device when the target discharge air temperature is equal to or higher than a second prescribed temperature that is higher than the first prescribed temperature.

4. The vehicle air conditioning system according to claim 2, wherein
the electric power distribution controller is configured to supply electric power to the electric powered refrigerant compressing device without supplying electric power to the electric heater when the target discharge air temperature is lower than a first prescribed temperature, and to supply electric power to the electric heater without supplying electric power to the electric powered refrigerant compressing device when the target discharge air temperature is equal to or higher than a second prescribed temperature that is higher than the first prescribed temperature.

* * * * *